United States Patent
Onomura et al.

(10) Patent No.: US 10,949,981 B2
(45) Date of Patent: Mar. 16, 2021

(54) POSITION MEASURING METHOD, POSITION MEASURING APPARATUS, AND POSITION MEASURING SYSTEM

(71) Applicant: SUBARU CORPORATION, Tokyo (JP)

(72) Inventors: Yoichi Onomura, Tokyo (JP); Akihiro Yamane, Tokyo (JP); Akitoshi Sakaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 86 days.

(21) Appl. No.: 16/371,700

(22) Filed: Apr. 1, 2019

(65) Prior Publication Data

US 2019/0304103 A1    Oct. 3, 2019

(30) Foreign Application Priority Data

Apr. 3, 2018    (JP) .............................. JP2018-071264

(51) Int. Cl.
  *G06K 9/00*    (2006.01)
  *G06T 7/246*    (2017.01)
  *G06T 7/60*    (2017.01)

(52) U.S. Cl.
  CPC ................ *G06T 7/248* (2017.01); *G06T 7/60* (2013.01)

(58) Field of Classification Search
  CPC . G06T 7/248; G06T 7/60; G06T 2207/10016; G06T 2207/30236; G06T 7/33
  See application file for complete search history.

(56) References Cited

U.S. PATENT DOCUMENTS

| 2004/0174453 A1 | 9/2004 | Okada et al. |
| 2016/0110701 A1 | 4/2016 | Herring et al. |

(Continued)

FOREIGN PATENT DOCUMENTS

| JP | 2002-188914 A | 7/2002 |
| JP | 4328551 B2 | 9/2009 |

(Continued)

OTHER PUBLICATIONS

Japanese Notice of Reasons for Refusal issued in corresponding Japanese Patent Application No. 2018-071264, dated Mar. 3, 2020, with English translation.

*Primary Examiner* — Dhaval V Patel
(74) *Attorney, Agent, or Firm* — McDermott Will & Emery LLP

(57) ABSTRACT

A position measuring apparatus includes an imaging device and a controller, and is mounted on one or more mobile objects and configured to measure a position of a target. The imaging device is configured to acquire images of the target from a plurality of locations that are different from each other. The controller is configured to measure, on the basis of the images of the target, one or both of orientations of the target as viewed from the respective locations and distances to the target from the respective locations, correct one of the measured orientations of the target and the measured distances to the target to thereby reduce a difference between times at which the respective images are acquired at the respective locations, and calculate an estimated position of the target, on a basis of one of the corrected orientations of the target and the corrected distances to the target.

5 Claims, 10 Drawing Sheets

(56) References Cited

U.S. PATENT DOCUMENTS

| | | | |
|---|---|---|---|
| 2017/0154426 A1* | 6/2017 | Cheng | G06K 9/6215 |
| 2019/0265734 A1* | 8/2019 | Liu | G05D 1/106 |
| 2020/0159222 A1* | 5/2020 | Mao | G05D 1/101 |

FOREIGN PATENT DOCUMENTS

| | | |
|---|---|---|
| JP | 2015-102352 A | 6/2015 |
| JP | 2017-053687 A | 3/2017 |

* cited by examiner

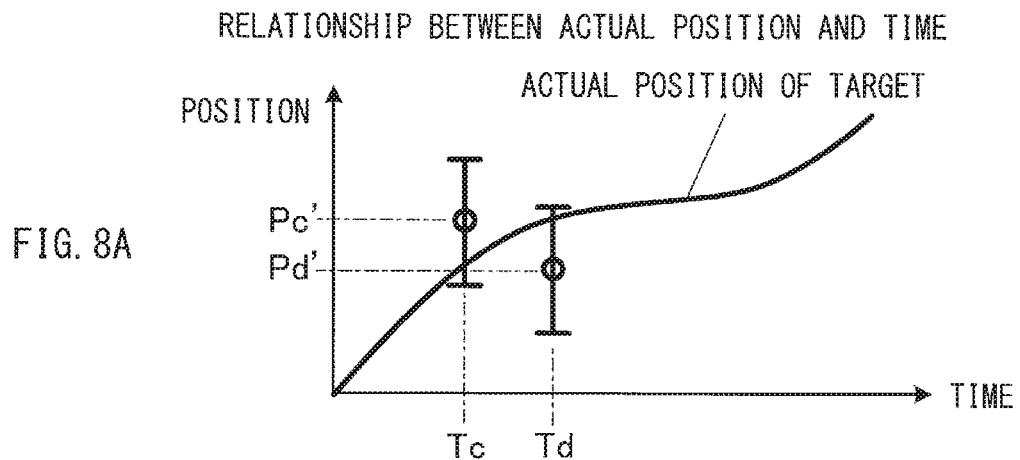
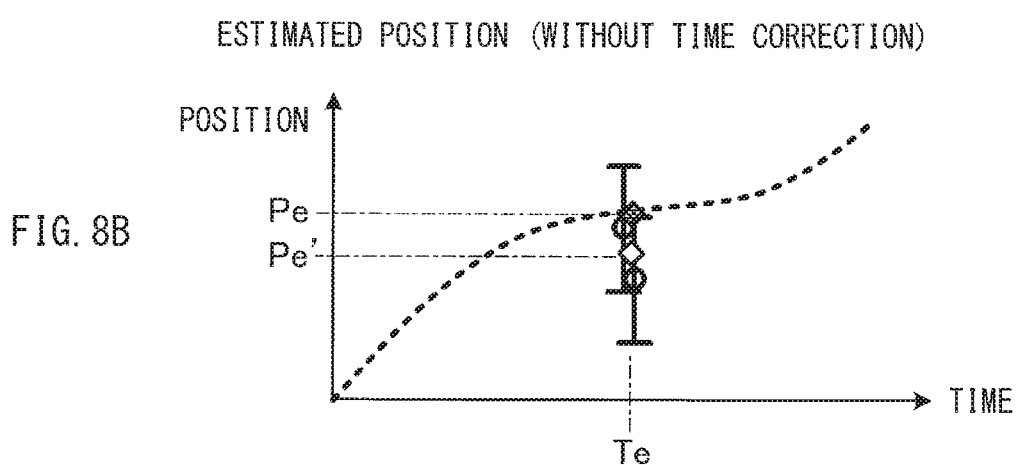
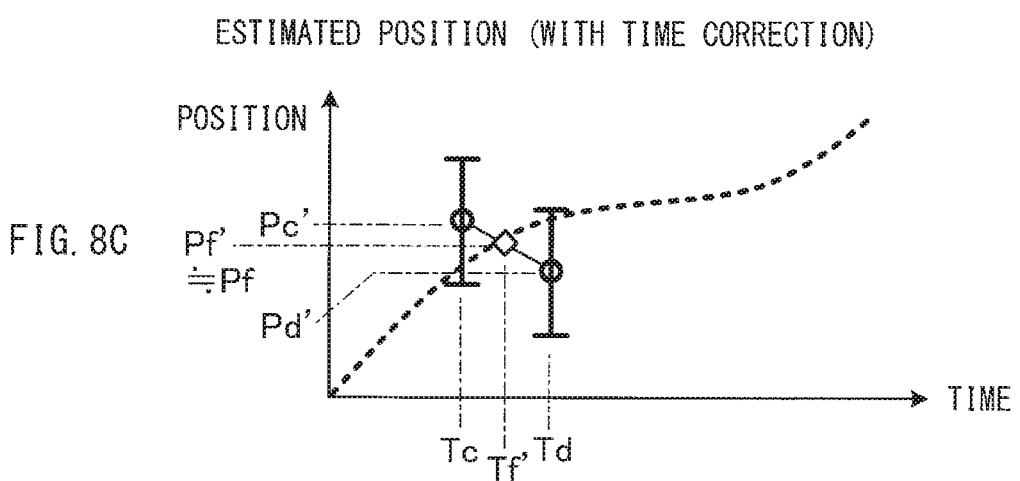

POSITION MEASURING METHOD, POSITION MEASURING APPARATUS, AND POSITION MEASURING SYSTEM

CROSS-REFERENCE TO RELATED APPLICATIONS

The present application claims priority from Japanese Patent Application No. 2018-071264 filed on Apr. 3, 2018, the entire contents of which are hereby incorporated by reference.

BACKGROUND

The technology relates to a position measuring method, a position measuring apparatus, and a position measuring system that measure a position of a movable object.

In general, radar has been used as a method that measures, from a mobile object, a position of a target such as a flying object. The radar, however, emits radio waves, making it possible for others to detect a position of the mobile object easily. An alternative method may be to measure a distance on the basis of a focus adjustment of an optical camera. Such a method, however, involves a large measurement error in a case where an object to be photographed is relatively distant, or in a case where an optical camera is used that has a large depth of field.

Japanese Unexamined Patent Application Publication (JP-A) No. 2002-188914 discloses a technique that measures target orientations from respective two different locations by utilizing a difference in position of a mobile object resulting from an elapse of time. The technique disclosed in JP-A No. 2002-188914 determines a position of a target on the basis of an intersection of the two orientations.

Japanese Patent (JP-B) No. 4328551 discloses a technique that measures a distance to a target by means of a stereo camera mounted on a body of an aircraft. The method disclosed in JP-B No. 4328551 allows for a measurement of a position of the target without involving emission of radio waves.

SUMMARY

An aspect of the technology provides a position measuring method that captures a target and measures a position of the target. The method includes: acquiring, with an imaging device, images of the target from a plurality of locations that are different from each other, in which the imaging device is mounted on one or more mobile objects; measuring, on the basis of the acquired images of the target, one or both of orientations of the target as viewed from the respective locations and distances to the target from the respective locations; correcting one of the measured orientations of the target and the measured distances to the target to thereby reduce a difference between times at which the respective images are acquired at the respective locations; and calculating an estimated position of the target, on the basis of one of the corrected orientations of the target and the corrected distances to the target.

An aspect of the technology provides a position measuring apparatus mounted on one or more mobile objects and configured to measure a position of a target. The apparatus includes: an imaging device configured to acquire images of the target from a plurality of locations that are different from each other; and a controller configured to measure, on the basis of the images of the target acquired by the imaging device, one or both of orientations of the target as viewed from the respective locations and distances to the target from the respective locations, correct one of the measured orientations of the target and the measured distances to the target to thereby reduce a difference between times at which the respective images are acquired at the respective locations, and calculate an estimated position of the target, on the basis of one of the corrected orientations of the target and the corrected distances to the target.

An aspect of the technology provides a position measuring system configured to measure a position of a target. The system includes: a first mobile object having a first imaging device, in which the first imaging device is configured to acquire a first image of the target from a first location; a second mobile object having a second imaging device, in which the second imaging device is configured to acquire a second image of the target from a second location; and a calculator configured to transmit signals between the calculator and the first mobile object and between the calculator and the second mobile object. The calculator is configured to measure, on the basis of the first image, a first orientation of the target as viewed from the first location and a first distance to the target from the first location, to thereby acquire a first position of the target determined at the first location, measure, on the basis of the second image, a second orientation of the target as viewed from the second location and a second distance to the target from the second location, to thereby acquire a second position of the target determined at the second location, calculate a time at which the first image is acquired at the first location and a time at which the second image is acquired at the second location, respectively on a basis of a time at which the calculator has received the first position and a time at which the calculator has received the second position, and calculate a middle position between the first position determined at the first location and the second position determined at the second location, and a middle time between the time at which the first image is acquired at the first location and the time at which the second image is acquired at the second location, the middle position being calculated as an estimated position of the target, the middle time being a time corresponding to the middle position.

An aspect of the technology provides a position measuring system configured to measure a position of a target. The system includes: a first mobile object having a first imaging device, in which the first imaging device is configured to acquire a first image of the target from a first location; a second mobile object having a second imaging device, in which the second imaging device is configured to acquire a second image of the target from a second location; and a calculator configured to transmit signals between the calculator and the first mobile object and between the calculator and the second mobile object. The calculator is configured to measure, on the basis of the first image, a first orientation of the target as viewed from the first location and a first orientation angular velocity of the target as viewed from the first location, measure, on the basis of the second image, a second orientation of the target as viewed from the second location and a second orientation angular velocity of the target as viewed from the second location, correct the first orientation and the second orientation respectively to the first orientation that is based on a first time at which the calculator has received the first orientation and the first orientation angular velocity and to the second orientation that is based on a second time at which the calculator has received the second orientation and the second orientation angular velocity, respectively on the basis of the first orientation, the first orientation angular velocity, and a first transmission time of transmitting a first signal from the first mobile object to the calculator and on the basis of the second orientation, the second orientation angular velocity, and a second transmission time of transmitting a second signal from the second mobile object to the calculator, and calculate an estimated position of the target, on the basis of the corrected first orientation as viewed from the first location and the corrected second orientation as viewed from the second location.

BRIEF DESCRIPTION OF THE DRAWINGS

FIGS. 8A and 8B are each a diagram describing a position measuring method according to a comparative example.

FIG. 8C is a diagram describing an example of the position measuring method according to one example implementation.

DETAILED DESCRIPTION

Figure 1:
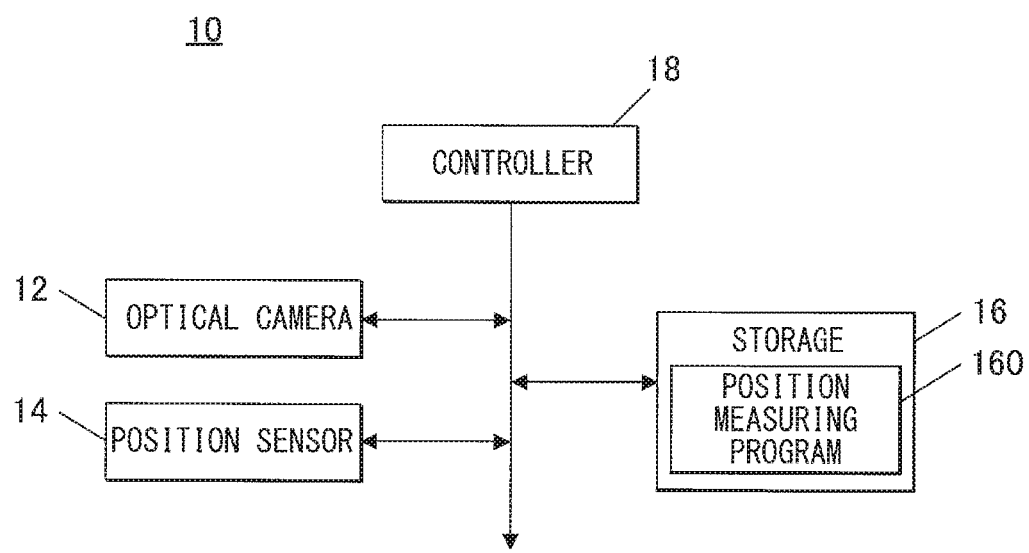
FIG. 1 is a block diagram illustrating an example of a configuration of an aircraft according to one example implementation of the technology.

In the following, some example implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A technique disclosed in JP-A No. 2002-188914 allows for a measurement of a position of a target by means of a single mobile object. On the other hand, the technique simply determines the position of the target on the basis of an intersection of two orientations and thus involves a large error in a case where the target is moving. A method similar to the technique disclosed in JP-A No. 2002-188914 may be to determine a position of a target by capturing the target from different directions by a plurality of mobile objects. Employing the method similar to the technique disclosed in JP-A No. 2002-188914 by the plurality of mobile objects, however, also involves a measurement error caused by a time lag, in a case where setting of time on the basis of signals, such as global positioning system (GPS) signals, is difficult or not possible.

A technique disclosed in JP-B No. 4328551 is limited, in distance between two cameras structuring a stereo camera, by a scale of a body of a mobile object. Such a limitation causes a measurement distance to a target to be significantly long with respect to the distance between the two cameras in an example case where the target significantly distant from the mobile object, such as an aircraft, is to be captured. Accordingly, there is room for further improvement in the technique disclosed in JP-B No. 4328551 in terms of a measurement error in a distance direction.

It is desirable to provide a position measuring method, a position measuring apparatus, and a position measuring system that measure, with improved accuracy, a position of a target captured by a mobile object without depending on an external signal.

[1. First Example Implementation]

A description is given first of a first example implementation of the technology. The first example implementation captures a moving target T illustrated in FIG. 3 and other drawings and measures a position of the target T only by a single aircraft 10. The aircraft 10 may be an example of application to which any implementation of the technology is applied.

[1-1. Configuration of Aircraft]

First, a description is given of an example of a configuration of the aircraft 10 according to the first example implementation.

FIG. 1 is a block diagram illustrating an example of a configuration of the aircraft 10.

Referring to FIG. 1, the aircraft 10 may include an optical camera 12, a position sensor 14, a storage 16, and a controller 18, in addition to an unillustrated flight mechanism. A position measuring apparatus according to any implementation of the technology may include the optical camera 12, the position sensor 14, and the controller 18.

The optical camera 12 may be configured to acquire information on an image outside the own aircraft 10. In the first example implementation, the optical camera 12 may acquire an image of the target T illustrated in FIG. 3 and other drawings. The optical camera 12 may be so disposed as to allow its facing direction to be varied freely. The optical camera 12 can be a high-speed camera having a predetermined shutter speed. In one implementation, the optical camera 12 may serve as an "imaging device".

The position sensor 14 may acquire information on a position of the own aircraft 10, including an altitude. For example, in the first example implementation, the position sensor 14 can be an inertial navigation device that does not require information based on radio waves derived from the outside. The position sensor 14 may acquire the position information of the own aircraft 10 on the basis of a control command derived from the controller 18, and output the acquired position information to the controller 18.

The storage 16 may be a memory that holds a program or data that achieves various operations of the aircraft 10, and may also serve as a workspace. In the first example implementation, the storage 16 may store in advance a position measuring program 160.

The position measuring program 160 may cause the controller 18 to execute a position measuring process to be described later in greater detail.

The controller 18 may perform a central control of each part of the aircraft 10. In one example, the controller 18 may control the driving of the unillustrated fight mechanism to thereby control a flight of the aircraft 10, and may control an operation of any device such as the optical camera 12 or the position sensor 14. The controller 18 may also expand the program stored in the storage 16 to thereby execute various processes in accordance with the expanded program. Further, the controller 18 may count elapsed time to thereby acquire the time.

[1-2. Position Measuring Method]

A description is given next of an example of a position measuring method, according to the first example implementation, that measures a position of the target T by the aircraft 10.

Figure 2:
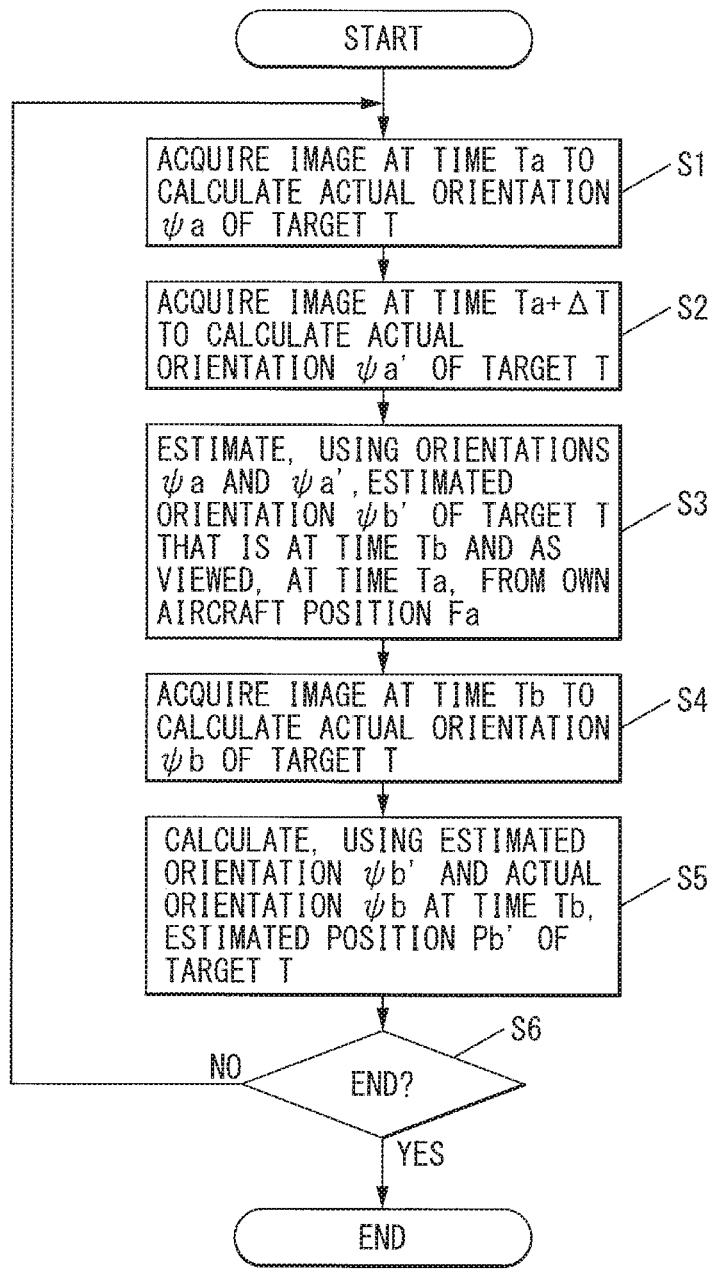
FIG. 2 is a flowchart illustrating an example of a position measuring method according to one example implementation.
Figure 3:
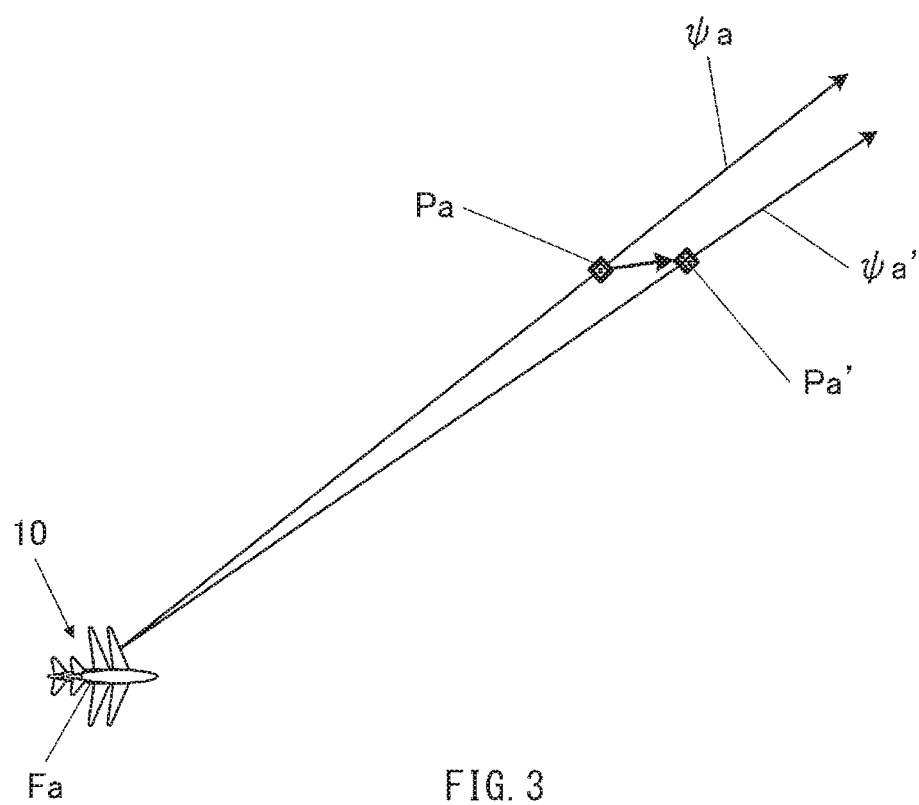
FIG. 3 is a diagram describing an example of the position measuring method according to one example implementation.
Figure 4:
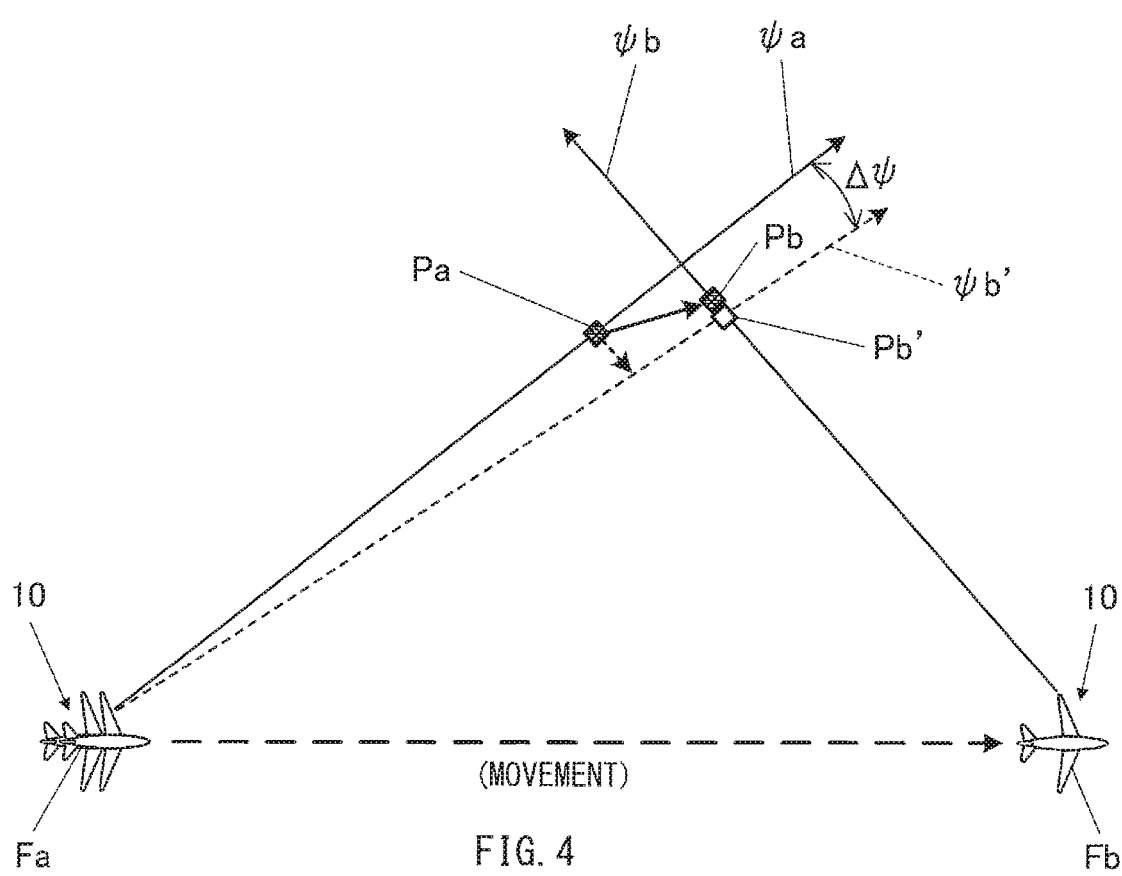
FIG. 4 is a diagram describing an example of the position measuring method according to one example implementation.

FIG. 2 is a flowchart illustrating the position measuring method. FIGS. 3 and 4 each describe an example of the position measuring method.

The position measuring method according to the first example implementation involves acquiring, with the optical camera 12, an image of the flying target T or the moving target T, and measuring a position of the target T on the basis of information on the acquired image. In other words, in an example implementation, the position measuring method may include measuring an orientation as viewed from the aircraft 10 and a distance to the target T from the aircraft 10. The controller 18 may execute the position measuring process performed upon the position measuring method, through reading the position measuring program 160 from the storage 16 and expanding the read position measuring program 160.

Referring to FIG. 2, upon execution of the position measuring process, the controller 18 may first calculate an actual orientation $\psi a$ of the target T that is at a certain time Ta and as viewed from an own aircraft position Fa of the aircraft 10 (step S1).

In one example, referring to FIG. 3, the controller 18 may acquire, with the position sensor 14, the position information of the own aircraft 10 at the time Ta, and may thereby determine the own aircraft position Fa. Further, in one example, the controller 18 may perform imaging, with the optical camera 12, of the target T at the time Ta, and may thereby calculate, on the basis of information on an image obtained by the imaging and an orientation of the imaging, the orientation $\psi a$ in which a position Pa of the target T is viewed from the own aircraft position Fa at the time Ta. The position information of the own aircraft 10 may include the altitude.

In one implementation, the term "orientation" encompasses not only a bearing (i.e., a direction in a horizontal plane) but also a vertical direction.

Thereafter, the controller 18 may calculate an actual orientation $\psi a'$ of the target T that is at a time Ta+$\Delta$T and as viewed from the own aircraft position Fa (step S2). The time Ta+$\Delta$T may the time in which a small amount of time $\Delta$T has elapsed from the time Ta.

In step S2, an own aircraft position of the aircraft 10 at the time Ta+$\Delta$T is deemed as being equal to the own aircraft position Fa at the time Ta, in view of the time $\Delta$T which is the small amount of time. With exception of the own aircraft position at the time Ta+$\Delta$T, in step S2, the controller 18 may calculate the orientation $\psi a'$ of the target T in a manner similar to that of step S1. Accordingly, in one example, the controller 18 may perform imaging, with the optical camera 12, of the target T at the time Ta+$\Delta$T, and may thereby calculate, on the basis of information on an image obtained by the imaging and an orientation of the imaging, the orientation $\psi a'$ in which a position Pa' of the target T is viewed from the own aircraft position Fa at the time Ta+$\Delta$T.

Thereafter, the controller 18 may calculate an estimated orientation $\psi b'$ of the target T that is at a time Tb and as viewed, at the time Ta, from the own aircraft position Fa (step S3). The time Tb may the time at which a predetermined time sufficiently larger than the time $\Delta$T has elapsed from the time Ta, and at which an orientation $\psi b$ of the target T is to be actually calculated from an image of the target T at later-described step S4.

In one example, in step S3, the controller 18 may first calculate, using the orientations $\psi a$ and $\psi a'$ of the target T respectively acquired at steps S1 and S2, an amount of variation in the orientation of the target T that is from the time Ta to the time Tb (hereinafter simply referred to as an "orientation variation $\Delta\psi$" of the target T) on the basis of the following Expression 1.

$$\Delta\psi=(Tb-Ta)\times(\psi a'-\psi a)/\Delta T \qquad \text{Expression 1}$$

In other words, the controller 18 may multiply a time, from the time Ta to the time Tb, by an orientation angular velocity $\omega$, to thereby calculate the orientation variation $\Delta\psi$.

Further, referring to FIG. 4, the controller 18 may add the thus-calculated orientation variation $\Delta\psi$ to the actual orientation $\psi a$ of the target T that is at the time Ta, to thereby determine the estimated orientation $\psi b'$ of the target T that is at the time Tb and as viewed from the own aircraft position Fa, as expressed by the following Expression 2.

$$\psi b'=\psi a+\Delta\psi \qquad \text{Expression 2}$$

Thereafter, the controller 18 may calculate the actual orientation $\psi b$ of the target T that is at the time Tb and as viewed from an own aircraft position Fb of the aircraft 10 (step S4).

In step S4, the controller 18 may calculate the orientation $\psi b$ of the target T in a manner similar to that of step S1. Accordingly, in one example, the controller 18 may acquire, with the position sensor 14, the position information of the own aircraft 10 at the time Tb, and may thereby determine the own aircraft position Fb. Further, in one example, the controller 18 may perform imaging, with the optical camera 12, of the target T at the time Tb, and may thereby calculate, on the basis of information on an image obtained by the imaging and an orientation of the imaging, the orientation $\psi b$ in which an actual position Pb of the target T is viewed from the own aircraft position Fb at the time Tb. The position information of the own aircraft 10 may include the altitude.

Thereafter, the controller 18 may calculate an estimated position Pb' of the target T that is at the time Tb, on the basis of the estimated orientation $\psi b'$ of the target T at the time Tb and the actual orientation $\psi b$ of the target T at the time Tb (step S5).

In one example, the controller 18 may calculate the estimated position Pb' of the target T at the time Tb, from an intersection of the estimated orientation ψb' of the target T determined at step S3 and the actual orientation ψb of the target T determined at step S4.

The foregoing example acquisition procedure thus acquires the estimated position Pb' of the target T.

According to the example acquisition procedure described above, the orientation ψa is so corrected as to reduce a shift in orientation of the target T resulting from a difference between the time Ta and the time Tb at which the actual orientation ψa and the orientation ψb are respectively measured (i.e., at which the respective images are acquired). Further, according to the example acquisition procedure, the estimated position Pb' of the target T is calculated by means of the estimated position Pb' calculated through the correction of the orientation ψa. Hence, it is possible to make smaller an error in the actual position Pb of the target T than an example case where a position of the target T is calculated simply from an intersection of the orientation ψa and the orientation ψb.

Thereafter, the controller 18 may determine whether to end the position measuring process (step S6). If the controller 18 determines to end the position measuring process (step S6: YES), the controller 18 may end the position measuring process. In one example, the controller 18 may determine to end the position measuring process in a case where an operation of ending the position measuring process performed by an operator, such as a pilot, is received.

If the controller 18 determines not to end the position measuring process (step S6: NO), the controller 18 may cause the process to proceed to step S1 described above. Thereafter, in one example, the controller 18 may calculate the estimated position Pb' of the target T successively until the controller 18 determines that the position measuring process is to be ended. In one example, upon calculating the estimated position Pb' of the target T successively, the controller 18 may sequentially vary an interval between the time Ta and the time Tb while allowing the interval to be constant.

According to the first example implementation, the images of the target T are acquired from the respective own aircraft position Fa and Fb by the optical camera 12 mounted on the aircraft 10. On the basis of the acquired images, the orientations ψa and ψb of the target T as respectively reviewed from the own aircraft positions Fa and Fb are measured. Further, the measured two orientations ψa and ψb are so corrected as to reduce the difference between the times at which the respective images are acquired at the respective two own aircraft positions Fa and Fb (or between the measured time Ta and the measured time Tb). On the basis of the thus-corrected two orientations ψa and ψb, the estimated position Pb' of the target T is calculated.

Hence, it is possible to measure, with improved accuracy, a position of the target T captured by the aircraft 10 without depending on an external signal.

[2. Second Example Implementation]

A description is given next of a second example implementation of the technology.

The second example implementation differs from the foregoing first example implementation, in that a position of the target T is measured by a position measuring system 2 that includes a plurality of aircrafts 20 and a ground station 30.

Note that the same or equivalent elements as those of the first example implementation described above are denoted with the same reference numerals, and will not be described in detail.

[2-1. Configuration of Position Measuring System]

A description is given first of an example of a configuration of the position measuring system 2 according to the second example implementation.

Figure 5:
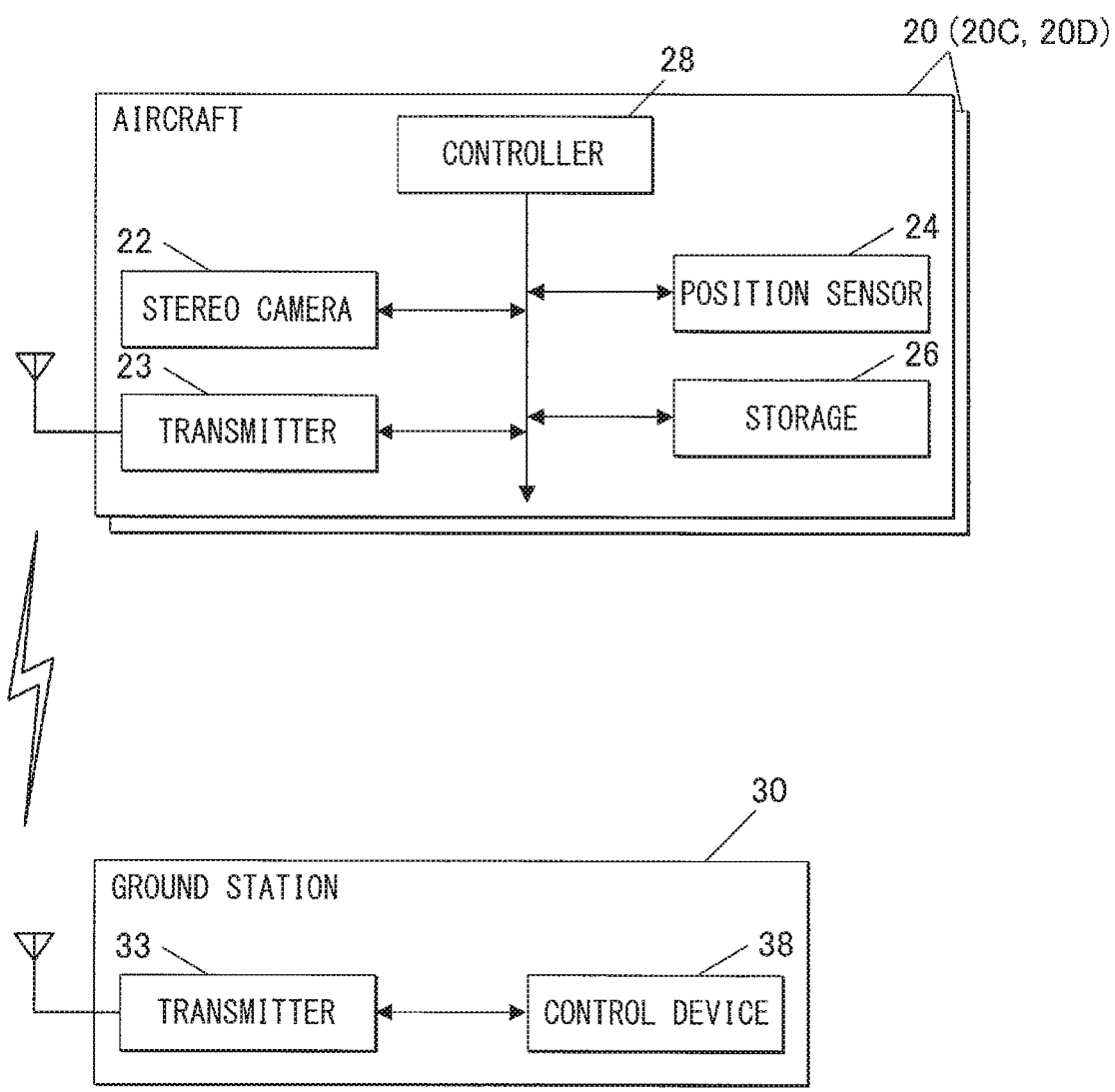
FIG. 5 is a block diagram illustrating an example of a configuration of a position measuring system according to one example implementation of the technology.

FIG. 5 is a block diagram illustrating an example of a configuration of the position measuring system 2.

Referring to FIG. 5, the position measuring system 2 includes the plurality of aircrafts 20 (aircrafts 20C and 20D) and the ground station 30. In the second example implementation, the number of aircrafts 20 is two; however, the number of aircrafts 20 is not limited thereto and can be three or more.

The aircrafts 20 each may include a position sensor 24, a storage 26, a controller 28, a stereo camera 22, and a transmitter 23. The position sensor 24, the storage 26, and the controller 28 may be respectively similar in configuration to the position sensor 14, the storage 16, and the controller 18 in the first example implementation.

The stereo camera 22 may be configured to acquire information on an image outside the aircraft 20. The stereo camera 22 may be so disposed as to allow its facing direction to be varied freely. The stereo camera 22 may photograph a target object from a plurality of different directions together and may be thus able to acquire information in a depth direction of the stereo camera 22 as well. In other words, the stereo camera 22 may also acquire information on a distance relative to the stereo camera 22. The stereo camera 22 may output the acquired information to the controller 28. In one implementation, the stereo camera 22 may serve as an "imaging device".

The transmitter 23 may establish a data link between the transmitter 23 and a transmitter 33 of the ground station 30. The transmitter 23 may be able to transmit various signals mutually between the transmitter 23 and the transmitter 33.

The ground station 30 may include the transmitter 33 and a control device 38. The transmitter 33 may be able to transmit various signals between the transmitter 33 and the transmitter 23 of each of the aircrafts 20. The control device 38 may perform a central control of each part of the ground station 30. In one implementation, the control device 38 may serve as a "calculator".

[2-2. Position Measuring Method]

A description is given next of an example of a position measuring method, according to the second example implementation, that measures a position of the target T by the position measuring system 2.

Figure 6:
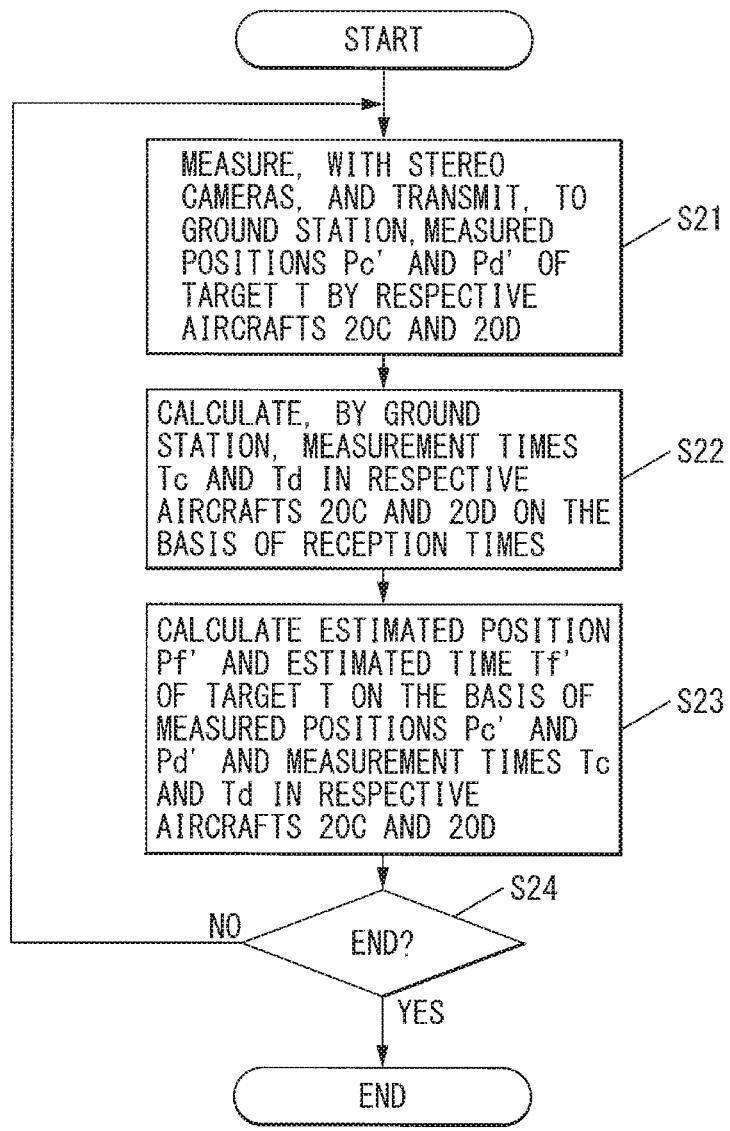
FIG. 6 is a flowchart illustrating an example of a position measuring method according to one example implementation.

FIG. 6 is a flowchart illustrating the position measuring method. FIGS. 7 and 8A to 8C each describe an example of the position measuring method.

The position measuring method according to the second example implementation involves measuring, with the stereo cameras 22 of the respective two aircrafts 20C and 20D that have captured the flying target T or the moving target T, positions of the target T. Further, the position measuring method according to the second example implementation involves calculating, with the ground station 30 and on the basis of pieces of information on the respective calculated positions and the respective times at which the positions are measured, a position of the target T that is higher in accuracy and the time at which the higher-accuracy position of the target T is measured.

Referring to FIG. 6, the controllers 28 of the respective two aircrafts 20 each may first measure a position of the target T by means of the own stereo camera 22, and each may transmit the measured position to the ground station 30 (step S21).

Figure 7:
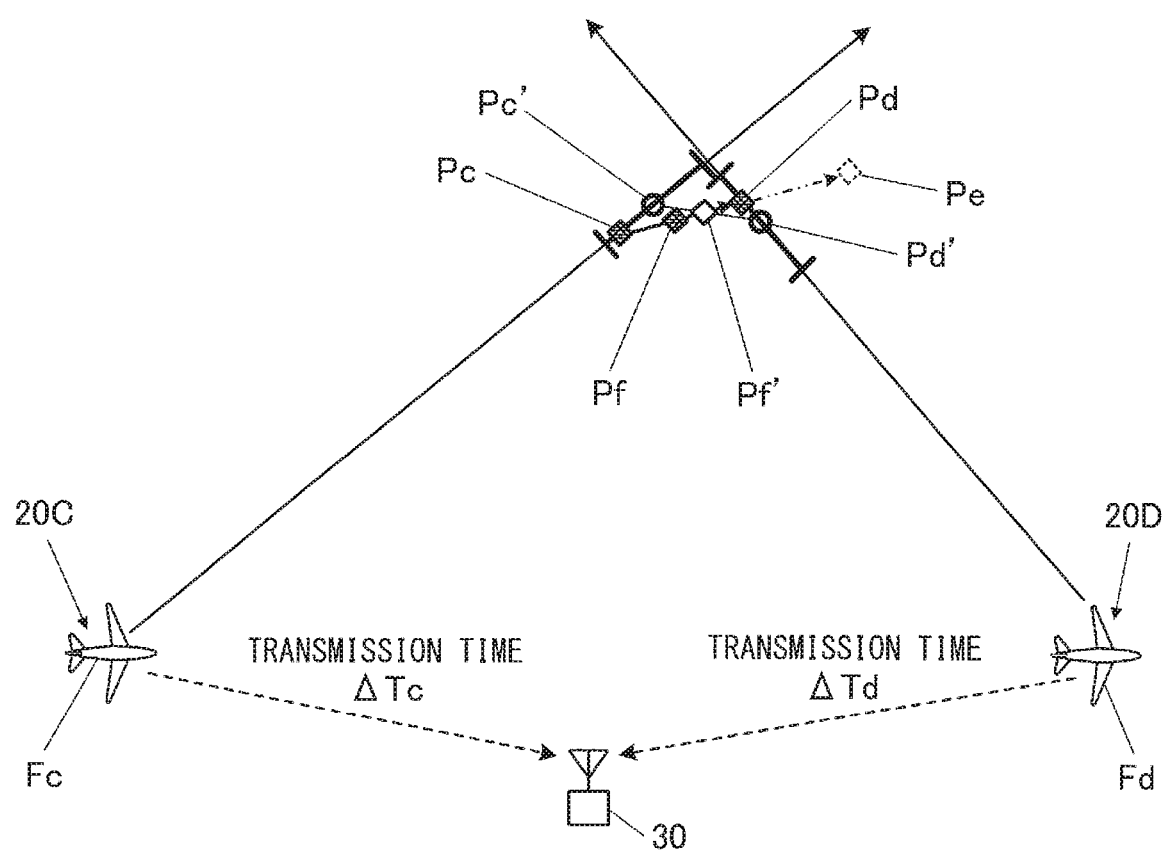
FIG. 7 is a diagram describing an example of the position measuring method according to one example implementation.

Referring to FIG. 7, in step S21, the controller 28 of the aircraft 20C of one of the aircrafts 20 may measure a position of the target T from an own aircraft position Fc at a time Tc, and the controller 28 of the aircraft 20D of the other of the aircrafts 20 may measure a position of the target T from an own aircraft position Fd at a time Td. In one example, the controllers 28 of the respective aircrafts 20 each may acquire, with the own position sensor 24, the position information of the own aircraft 20, and each may acquire, on the basis of an image acquired by the own stereo camera 22, an orientation of the target T as viewed from the corresponding own aircraft position Fc or Fd and a distance to the target T from the corresponding own aircraft position Fc or Fd. Further, in one example, the controllers 28 of the respective aircrafts 20 each may calculate a position of the target T on the basis of the acquired position information of the own aircraft 20, the orientation of the target T, and the distance to the target T, and each may transmit, with the transmitter 23, the calculated position of the target T to the ground station 30 together with the corresponding own aircraft position Fc or Fd. The position information of the own aircraft 20 may include the altitude. The position of the target T may include a coordinate.

It is to be noted that the stereo camera 22 can involve a large measurement error in a distance direction, due to the measurement distance to the target T that possibly becomes significantly long with respect to a distance between cameras of the stereo camera 22. It is to be also noted that the distance between the cameras can be limited by a scale of a body of the aircraft 20.

Due to the measurement error, the position measurement performed by the aircraft 20C results in acquisition of a measured position Pc' that is shifted in the distance direction relative to an actual position Pc of the target T that is at the time Tc. Similarly, due to the measurement error, the position measurement performed by the aircraft 20D results in acquisition of a measured position Pd' that is shifted in the distance direction relative to an actual position Pd of the target T that is at the time Td. The time Td may be greater than the time Tc (Td>Tc).

Thereafter, the control device 38 of the ground station 30 may calculate a measurement time Tc at which the position measurement is performed by the aircraft 20C at step S21, and a measurement time Td at which the position measurement is performed by the aircraft 20D at step S21 (step S22).

The control device 38 of the ground station 30 may calculate the measurement times Tc and Td on the basis of the following Expressions 3 and 4.

$$Tc = Te - \Delta Tc \quad \text{Expression 3}$$

$$Td = Te - \Delta Td \quad \text{Expression 4}$$

In the Expressions 3 and 4, Te denotes the time at which the ground station 30 has received the position information of the target T from the corresponding aircraft 20. Note that time Te may be different between the two aircrafts 20C and 20D. ΔTc and ΔTd each denote a transmission time of a signal between the ground station 30 and the aircraft 20C or between the ground station 30 and the aircraft 20D. In one example, the transmission times ΔTc and ΔTd each may be obtained through measuring a time until which a reference signal emitted from the ground station 30 is received back from the corresponding aircraft 20C or 20D.

In an alternative example, the transmission times ΔTc and ΔTd each may be determined through dividing a value of a corresponding distance Rc or Rd by a value of a propagation velocity C of radio waves. The distance Rc may be between the aircraft 20C and the ground station 30, and the distance Rd may be between the aircraft 20D and the ground station 30. The distances Rc and Rd may be determined from positions of the respective aircrafts 20 and a position of the ground station 30, which positions may be measured by means of a navigation that does not rely on GPS signals, such as a pure initial navigation.

Thereafter, the control device 38 of the ground station 30 may calculate an estimated position Pf' of the target T and an estimated time Tf' at which the estimated position Pf' is estimated, on the basis of the measurement positions of the target T measured by the respective aircrafts 20 and the measurement times at which the measurement positions of the target T are measured by the respective aircrafts 20 (step S23).

In one example, the control device 38 of the ground station 30 may calculate the estimated position Pf' on the basis of the two measured positions Pc' and Pd' calculated at step S21, and may calculate the estimated time Tf' that corresponds to the estimated position Pf' on the basis of the two measurement times Tc and Td calculated at step S22.

Methods of calculating the estimated position Pf' and the estimated time Tf' are not particularly limited and can be any calculation methods, as long as such methods achieve probable correspondence between the estimated position Pf' and the estimated time Tf' to be calculated. In the second example implementation, a position, i.e., a middle position, as an average of the two measured positions Pc' and Pd' may be determined as the estimated position Pf', and a time, i.e., a middle time, as an average of the two measurement times Tc and Td may be determined as the estimated time Tf'. In an alternative example, a position at which an error between the two measured positions Pc' and Pd' becomes the minimum may be determined as the estimated position Pf', and the time at which an error between the two measurement times Tc and Td becomes the minimum may be determined as the estimated time Tf'.

The foregoing example procedure thus acquires the estimated position Pf' of the target T and its corresponding estimated time Tf'.

The thus-acquired estimated position Pf' and estimated time Tf' both have been corrected appropriately in terms of time. Hence, the estimated position Pf' and estimated time Tf' are both smaller in error with respect to the actual position and the actual time, and have improved accuracy accordingly.

FIG. 8A illustrates a relationship of time versus an actual position of the target T and the measured positions Pc' and Pd' according to a comparative example. In the comparative example, the ground station 30 determines, as an estimated position Pe' of the target T, a middle position of two measurement positions (e.g., a position based on an average of two measurement positions) simply on the basis of values of the respective times Te at which the ground station 30 has received the respective pieces of position information, without performing the above-described time correction. Thus, in the comparative example, no consideration is given to a time lag that occurs upon the signal transmission to the ground station 30 from each of the aircrafts 20. Hence, it is highly likely that such an estimated position Pe' (=Pf') involves a large error with respect to an actual position Pe at the time Te, as illustrated in FIGS. 7 and 8B.

In contrast, according to the second example implementation, the measurement times Tc and Td may be determined on the basis of the respective times Tc at which the ground station 30 has received the respective pieces of position information, and the time that is the middle of the measurement times Tc and Td may be determined as the estimated time Tf' as illustrated in FIG. 8C. Further, according to the second example implementation, the position corresponding to the estimated time Tf' may be determined as the estimated position Pf' that is the middle of the measured positions Pc' and Pd' as illustrated in FIG. 8C. Accordingly, the time corresponding to the estimated position Pf' is so corrected appropriately as to reduce the difference between the measurement times Tc and Td (i.e., the times at which the respective images are acquired). Hence, it is possible to take into consideration the time lag that occurs upon the signal transmission to the ground station 30 from each of the aircrafts 20, and to determine the estimated position Pf' and estimated time Tf' that are both smaller in error with respect to the actual position and the actual time and that have improved accuracy.

It is to be noted that the two measured positions Pc' and Pd' are so separated as to be positioned on both sides (upper and lower sides) of the actual position in one example illustrated in FIGS. 8A to 8C; however, example effects similar to those described above are achieved as well even in a case where the measured positions Pc' and Pd' swung on the same side relative to the actual position. It is to be also noted that the shift in time tends to become large in a case where a speed of the target T is high, a variation in the speed of the target T is large, or both, in which case a technique according to the second example implementation is particularly useful.

Thereafter, the control device 38 of the ground station 30 may determine whether to end the measurement of the position of the target T (step S24). If the control device 38 determines to end the position measurement (step S24: YES), the control device 38 may end the position measurement, and may transmit, to each of the aircrafts 20, a command signal indicating the ending of the position measurement. In one example, the control device 38 may determine to end the position measurement in a case where an operation of ending the position measurement performed by an operator is received.

If the control device 38 determines not to end the position measurement (step S24: NO), the control device 38 may cause the process to proceed to step S21 described above. Thereafter, in one example, the control device 38 may calculate the estimated position Pf' and its estimated time Tf' of the target T successively until the control device 38 determines that the position measurement is to be ended.

According to the second example implementation, the images of the target T are acquired from the respective own aircraft position Fc and Fd by the stereo cameras 22 mounted on the respective aircrafts 20. On the basis of the acquired images, the orientations of the target T as viewed from the respective own aircraft positions Fc and Fd and the distances to the target T from the respective own aircraft positions Fc and Fd are measured. Further, the measured distances, i.e., each correspondence between the position of the target T and its time, are so corrected as to reduce the difference between the times at which the respective images are acquired (or between the measured time Tc and the measured time Td) to thereby calculate the estimated position Pf' and the estimated time Tf' of the target T.

Hence, it is possible to measure, with improved accuracy, a position of the target T captured by the two aircrafts 20C and 20D without depending on an external signal.

[3. Third Example Implementation]

A description is given next of a third example implementation of the technology.

The third example implementation differs from the foregoing second example implementation, in that a plurality of aircrafts of a position measuring system use their respective optical cameras in place of the stereo cameras to determine the orientations of the target T and to perform the position measurement of the target T.

Note that the same or equivalent elements as those of the second example implementation described above are denoted with the same reference numerals, and will not be described in detail.

[3-1. Configuration of Position Measuring System]

A description is given first of an example of a configuration of a position measuring system 4 according to the third example implementation.

Figure 9:
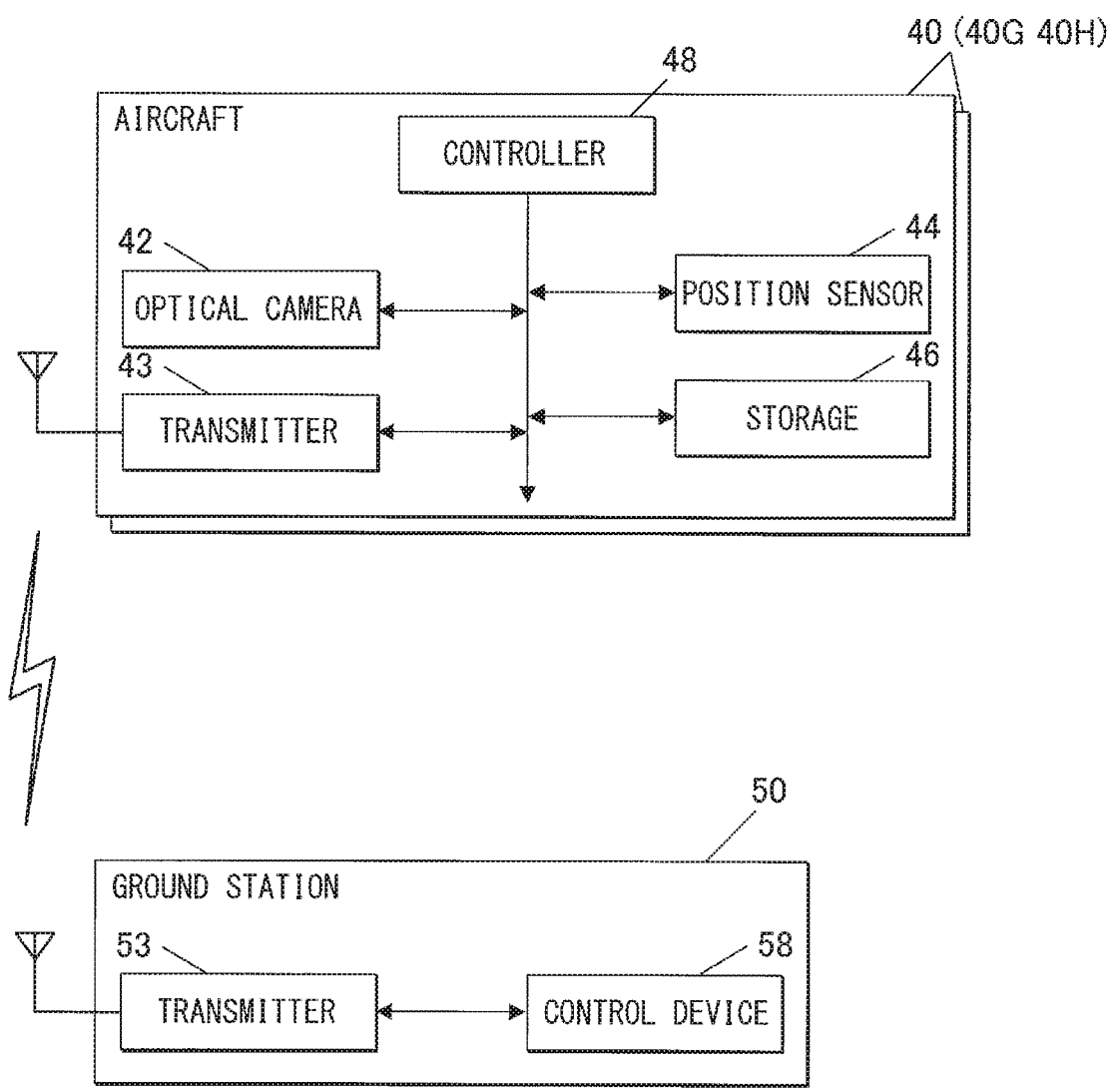
FIG. 9 is a block diagram illustrating an example of a configuration of a position measuring system according to one example implementation of the technology.

FIG. 9 is a block diagram illustrating an example of a configuration of the position measuring system 4.

Referring to FIG. 9, the position measuring system 4 includes a plurality of aircrafts 40 (aircrafts 40G and 40H) and a ground station 50. In the third example implementation, the number of aircrafts 40 is two; however, the number of aircrafts 40 is not limited thereto and can be three or more.

The aircrafts 40 each may include an optical camera 42, a position sensor 44, a storage 46, a controller 48, and a transmitter 43. The optical camera 42, the position sensor 44, the storage 46, and the controller 48 may be respectively similar in configuration to the optical camera 12, the position sensor 14, the storage 16, and the controller 18 in the first example implementation. The transmitter 43 may be similar in configuration to the transmitter 23 in the second example implementation.

The ground station 50 may include a transmitter 53 and a control device 58. The transmitter 53 may be able to transmit various signals between the transmitter 53 and the transmitter 43 of each of the aircrafts 40. The control device 58 may perform a central control of each part of the ground station 50. In one implementation, the control device 38 may serve as the "calculator".

[3-2. Position Measuring Method]

A description is given next of an example of a position measuring method, according to the third example implementation, that measures a position of the target T by the position measuring system 4.

Figure 10:
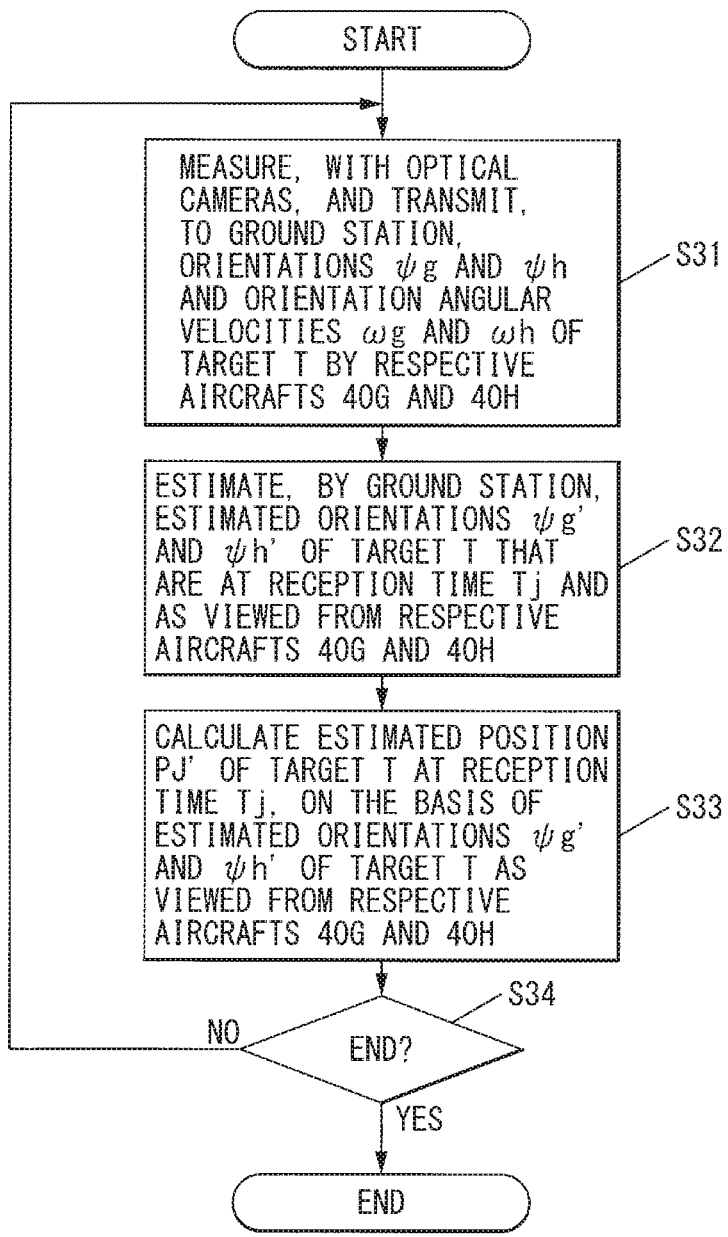
FIG. 10 is a flowchart illustrating an example of a position measuring method according to one example implementation.
Figure 11:
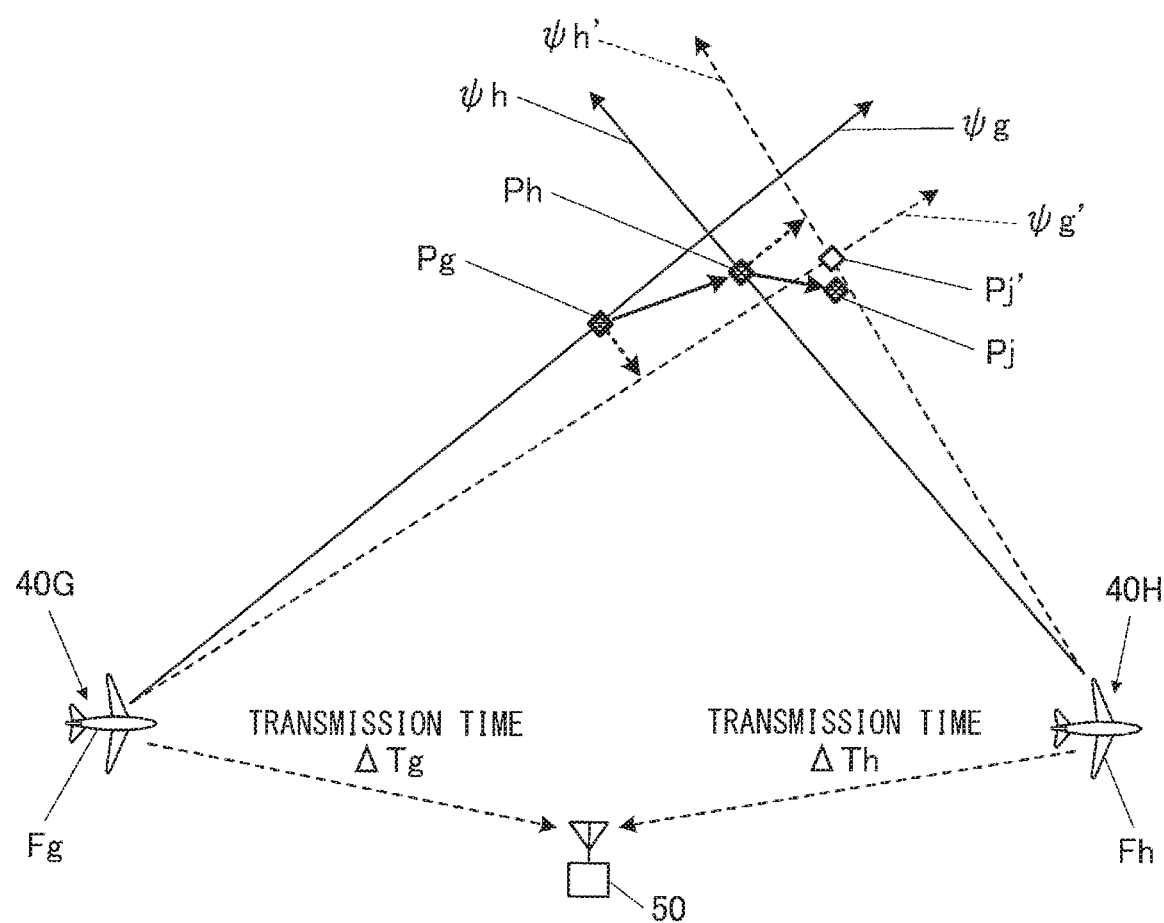
FIG. 11 is a diagram describing an example of the position measuring method according to one example implementation.

FIG. 10 is a flowchart illustrating the position measuring method. FIG. 11 describes an example of the position measuring method.

The position measuring method according to the third example implementation involves acquiring, with the optical cameras 42 of the respective two aircrafts 40G and 40H, images of the flying target T or the moving target T, and measuring, with the ground station 50, a position of the target T on the basis of pieces of information on the acquired images.

Referring to FIG. 10, the controllers 48 of the respective two aircrafts 40 each may measure, on the basis of the image obtained by the own optical camera 42, an orientation and an orientation angular velocity of the target T as viewed from the own aircraft 40, and each may transmit the measured orientation and the orientation angular velocity to the ground station 50 (step S31).

In one example, referring to FIG. 11, the controller 48 of the aircraft 40G of one of the aircrafts 40 may measure an orientation ψg in which a position Pg of the target T is viewed from an own aircraft position Fg at a time Tg, and the controller 48 of the aircraft 40H of the other of the aircrafts 40 may measure an orientation ψh in which a position Ph of the target T is viewed from an own aircraft position Fh at a time Th. The time Th may be greater than the time Tg (Th>Tg). Further, the controllers 48 of the respective aircrafts 40 each may also measure an orientation of the target T that is at a time in which the small amount of time ΔT has elapsed from the corresponding time Tg or Th, and each may calculate a corresponding orientation angular velocity ωg or ωh. The controllers 48 of the respective aircrafts 40 each may calculate the orientation angular velocity ωg or ωh through dividing a value of a difference between the corresponding orientation ψg or ψh and the measured orientation by a value of the small amount of time ΔT. Methods of determining the orientations and the orientation angular velocity by each of the aircrafts 40 may be similar to those of the first example implementation. Thereafter, the controllers 48 of the respective aircrafts 40 each may transmit, with the transmitter 43, the corresponding calculated orientation ψg or ψh and the corresponding orientation angular velocity ωg or ωh to the ground station 50 together with the corresponding own aircraft position Fg or Fh.

Thereafter, the control device 58 of the ground station 50 may calculate an estimated orientation ψg' of the target T that is at a time Tj and as viewed from the aircraft 40G, and an estimated orientation ψh' of the target T that is at the time Tj and as viewed from the aircraft 40H (step S32). The time Tj may be the time at which the ground station 50 has received the transmitted information from the corresponding aircraft 40.

The control device 58 of the ground station 50 may calculate the estimated orientations ψg' and ψh' on the basis of the following Expressions 5 and 6.

$$\psi g' = \psi g + \omega g \times \Delta Tg \quad \text{Expression 5}$$

$$\psi h' = \psi h + \omega h \times \Delta Th \quad \text{Expression 6}$$

In the Expressions 5 and 6, ΔTg and ΔTh each denote a transmission time of a signal between the ground station 50 and the aircraft 40G or between the ground station 50 and the aircraft 40H. In one example, the transmission times ΔTg and ΔTh each may be obtained through measuring a time until which a reference signal emitted from the ground station 50 is received back from the corresponding aircraft 40G or 40H. In an alternative example, the transmission times ΔTg and ΔTh each may be determined through dividing a value of a corresponding distance Rg or Rh by a value of the propagation velocity C of radio waves. The distance Rg may be between the aircraft 40G and the ground station 50, and the distance Rh may be between the aircraft 40H and the ground station 50. The distances Rg and Rh may be determined from positions of the respective aircrafts 40 and a position of the ground station 50, which positions may be measured by means of a navigation that does not rely on the GPS signals, such as the pure initial navigation.

Thereafter, the control device 58 of the ground station 50 may calculate an estimated position PJ' of the target T at the time Tj, on the basis of the estimated orientations ψg' and ψh' of the target T (step S33).

In one example, the control device 58 of the ground station 50 may calculate the estimated position Pj' of the target T that is at the times Tj at which the ground station 50 has received the respective pieces of transmitted information from the respective aircrafts 40, from an intersection of the two estimated orientations ψg' and ψh' determined at step S32.

The foregoing example procedure thus acquires the estimated position Pj' of the target T.

The thus-acquired estimated position Pj' has been corrected appropriately in terms of orientation. Hence, the estimated position Pj' is smaller in error with respect to an actual position, and has improved accuracy accordingly.

Specifically, in the third example implementation, the estimated position Pj' is determined not simply on the basis of the intersection of the measured orientations ψg and ψh of the target T measured by the respective aircrafts 40. In the third example implementation, to take into consideration a time lag that occurs upon the signal transmission to the ground station 50 from each of the aircrafts 40, the estimated position Pj' is determined on the basis of the intersection of the estimated orientations ψg' and ψh' that is applied with a variation in orientation occurred during the time lag. Accordingly, the orientation of the target T is so corrected appropriately as to reduce the difference between the measurement times Tg and Th (i.e., the times at which the respective images are acquired). Hence, it is possible to take into consideration the time lag that occurs upon the signal transmission to the ground station 50 from each of the aircrafts 40, and to determine the estimated position Pj' that is smaller in error with respect to the actual position and that has improved accuracy.

Thereafter, the control device 58 of the ground station 50 may determine whether to end the measurement of the position of the target T (step S34). If the control device 58 determines to end the position measurement (step S24: YES), the control device 58 may end the position measurement, and may transmit, to each of the aircrafts 40, a command signal indicating the ending of the position measurement. In one example, the control device 58 may determine to end the position measurement in a case where an operation of ending the position measurement performed by an operator is received.

If the control device 58 determines not to end the position measurement (step S34: NO), the control device 58 may cause the process to proceed to step S31 described above. Thereafter, in one example, the control device 58 may calculate the estimated position Pj' of the target T successively until the control device 58 determines that the position measurement is to be ended.

According to the third example implementation, the images of the target T are acquired from the respective own aircraft position Fg and Fh by the optical cameras 42 mounted on the respective aircrafts 40. On the basis of the acquired images, the orientations ψg and ψh of the target T as respectively viewed from the own aircraft positions Fg and Fh are measured. Further, the measured orientations ψg and ψh are so corrected as to reduce the difference between the times at which the respective images are acquired (or between the measured time Tg and the measured time Th). On the basis of the thus-corrected estimated orientations ψg' and ψh', the estimated position Pj' of the target T is calculated.

Hence, it is possible to measure, with improved accuracy, a position of the target T captured by the two aircrafts 40G and 40H without depending on an external signal.

[Modification Examples]

Although some implementations of the technology have been described in the foregoing with reference to the accompanying drawings, the technology is by no means limited to the example implementations described above. Various changes and modifications may be made to any implementation without departing from the scope of the technology. The technology is intended to include such modifications and alterations in so far as they fall within the scope of the appended claims or the equivalents thereof.

For example, in the second and third example implementations, the ground station receives the information on the measurement, etc., from the two aircrafts to calculate the position of the target T. In an alternative example implementation, each of the aircrafts may at least acquire an image of the target T, and processes other than the acquisition of the images, such as any calculation process, may be performed by the ground station or by all or part of the aircrafts.

Further, the ground station does not necessarily have to perform the calculation of the position of the target T. In an alternative example implementation, any of the aircrafts may perform the calculation of the position of the target T. Such an alternative example implementation makes it possible to eliminate the use of ground station.

The mobile object according to any implementation of the technology is not limited to an aircraft. In an alternative example implementation, the mobile object may be any movable structure such as a vessel or a vehicle. The mobile object can be a manned mobile object or an unmanned mobile object.

Furthermore, the technology encompasses any possible combination of some or all of the various implementations and the modification examples described herein and incorporated herein.

The controllers 18, 28, and 48 and the control devices 38 and 58 illustrated in FIGS. 1, 5, and 9 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of any or all of the controllers 18, 28, and 48 and the control devices 38 and 58. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of any or all of the controllers 18, 28, and 48 and the control devices 38 and 58 illustrated in 1, 5, and 9.

The invention claimed is:

1. A position measuring method that captures a target and measures a position of the target, the method comprising:
   acquiring, with an imaging device mounted on a mobile object, a first image of the target from a first location and a second image of the target from a second location after acquiring the first image, the first location and the second location being different from each other;
   measuring, 1) based on the first image, a first orientation of the target as viewed from the first location, and 2) based on the second image, a second orientation of the target as viewed from the second location;
   calculating an estimated orientation of the target that is as viewed from the first location and at a time at which the second image is acquired, through correcting the first orientation based on a difference between a time at which the first image is acquired and the time at which the second image is acquired; and
   calculating, based on the second orientation and the estimated orientation, an estimated position of the target that is as viewed from the first location and at a time at which the second image is acquired.

2. The position measuring method according to claim 1, wherein the calculating the estimated orientation of the target comprises:
   calculating an amount of variation in the first orientation that is from the time at which the first image is acquired to the time at which the second image is acquired, on a basis of an orientation angular velocity of the target, the orientation angular velocity being determined from images that are acquired at the first location during a predetermined amount of time; and
   adding the calculated amount of variation in the first orientation to the measured first orientation to thereby calculate the estimated orientation.

3. A position measuring method for measuring a positon of a target, the method comprising:
   acquiring, using a first imaging device mounted on a first mobile object, a first image of the target from a first location;
   measuring, based on the first image, a first orientation of the target as viewed from the first location and a first orientation angular velocity of the target as viewed from the first location;
   transmitting the first orientation and the first orientation angular velocity to a calculator;
   acquiring, using a second imaging device mounted on a second mobile object, a second image of the target from a second location;
   measuring, based on the second image, a second orientation of the target as viewed from the second location and a second orientation angular velocity of the target as viewed from the second location; and
   transmitting the second orientation and the second orientation angular velocity to the calculator,
   wherein the calculator is configured to execute:
      correcting the first orientation and the second orientation respectively to the first orientation that is based on a first time at which the calculator has received the first orientation and the first orientation angular velocity and to the second orientation that is based on a second time at which the calculator has received the second orientation and the second orientation angular velocity, respectively on a basis of the first orientation, the first orientation angular velocity, and a first transmission time of transmitting a first signal from the first mobile object to the calculator and on a basis of the second orientation, the second orientation angular velocity, and a second transmission time of transmitting a second signal from the second mobile object to the calculator; and
      calculating an estimated position of the target, on a basis of the corrected first orientation as viewed from the first location and the corrected second orientation as viewed from the second location.

4. A position measuring apparatus mounted on one or more mobile objects and configured to measure a position of a target, the apparatus comprising:

an imaging device mounted on a mobile object, the imaging device being configured to acquire a first image of the target from a first location and a second image of the target from a second location after acquiring the first image, the first location and the second location being different from each other; and a controller configured to measure, 1) based on the first image, a first orientation of the target as viewed from the first location, and 2) based on the second image, a second orientation of the target as viewed from the second location, calculate an estimated orientation of the target that is as viewed from the first location and at a time at which the second image is acquired, through correcting the first orientation based on a difference between a time at which the first image is acquired and the time at which the second image is acquired, and calculate, based on the second orientation and the estimated orientation, an estimated position of the target that is as viewed from the first location and at a time at which the second image is acquired.

5. A position measuring system configured to measure a position of a target, the system comprising:

a first mobile object having a first imaging device, the first imaging device being configured to acquire a first image of the target from a first location;

a second mobile object having a second imaging device, the second imaging device being configured to acquire a second image of the target from a second location; and a calculator configured to transmit signals between the calculator and the first mobile object and between the calculator and the second mobile object, the calculator being configured to measure, on a basis of the first image, a first orientation of the target as viewed from the first location and a first distance to the target from the first location, to thereby acquire a first position of the target determined at the first location, measure, on a basis of the second image, a second orientation of the target as viewed from the second location and a second distance to the target from the second location, to thereby acquire a second position of the target determined at the second location, calculate a time at which the first image is acquired at the first location and a time at which the second image is acquired at the second location, respectively on a basis of a time at which the calculator has received the first position and a time at which the calculator has received the second position, and calculate a middle position between the first position determined at the first location and the second position determined at the second location, and a middle time between the time at which the first image is acquired at the first location and the time at which the second image is acquired at the second location, the middle position being calculated as an estimated position of the target, the middle time being a time corresponding to the middle position.

* * * * *